Jan. 23, 1968   P. A. WILKINS ET AL   3,364,916
HEATING DEVICES

Filed July 19, 1966   3 Sheets-Sheet 2

INVENTORS.
PHILIP ARTHUR WILKINS
ROYSTON AUBREY CHADBOURNE
BY Kurt Kelman
AGENT

United States Patent Office 3,364,916
Patented Jan. 23, 1968

3,364,916
HEATING DEVICES
Philip A. Wilkins, Codsall, and Royston A. Chadbourne, Dudley, England, assignors to Wilkins & Mitchell Limited, a British company
Filed July 19, 1966, Ser. No. 566,294
Claims priority, application Great Britain, July 29, 1965, 32,393/65
1 Claim. (Cl. 126—110)

ABSTRACT OF THE DISCLOSURE

This specification discloses a heater having a sealed combustion system and arranged to heat a stream of air by means of heat given off by a burner burning fluid i.e. gas or liquid. The heater employs two fan means, one for the air to be heated and the other for the combustion air. The air to be heated insulates the combustion chamber and said other fan is driven in dependence on rotation of said one fan means so that if the latter ceases to rotate so will said other fan means which will result in extinction of the burner and therefore prevent overheating since the burner will not operate on natural draught.

---

It is an object of the invention to provide a heater having a sealed combustion system which is extremely safe in use and which does not rely on overheat switches to prevent overheating although such a switch will normally be incorporated.

According to the invention, we provide a heater having a sealed combustion system and comprising a hollow heat exchange panel (as hereinafter defined) which is closed except for an air inlet at or adjacent to one end thereof and a flue gas outlet at or adjacent to the other end thereof, a burner for fluid fuel mounted in the panel adjacent to said one end, an outer hollow panel enveloping the inner panel but spaced therefrom to provide a passage for air to be heated between opposed walls of the panels, the outer panel having an air inlet at or adjacent to its end which is adjacent to the other end of the inner panel and having an outlet for heated air at or adjacent to its end which is adjacent to the one end of the inner panel so that substantially the whole of the heat exchange between the flue gases and the air to be heated which takes place through the walls of the inner panel is effected while the air and the flue gases are flowing in generally parallel directions in counter current, first and second co-axial fan means, an electric motor, first driving means interposed between the first fan means and the motor, second driving means independent of the first driving means and interposed between a second fan means and the first fan means, said second driving means driving the second fan means only when the first fan means is rotating, the first fan means being located at or adjacent to the inlet of the outer panel to induce air to flow through said passage, and an inlet duct to receive air for combustion from the second fan means and to deliver it to the inlet of the inner panel, the cross-sectional area of at least a part of the inlet duct being of such a size that the natural flow of air therethrough is insufficient to support combustion of the burner when the second fan means is inoperative.

By the term "panel" is meant a structure comprising two opposed side walls of sheet material extending between opposite ends of the structure, the side walls having lengths between said ends, and widths, measured at right angles to their lengths, which are considerably greater than the thickness of the structure measured in a direction perpendicular to the directions of measurement of said lengths and widths, the walls being connected at their edges.

Figure 1:
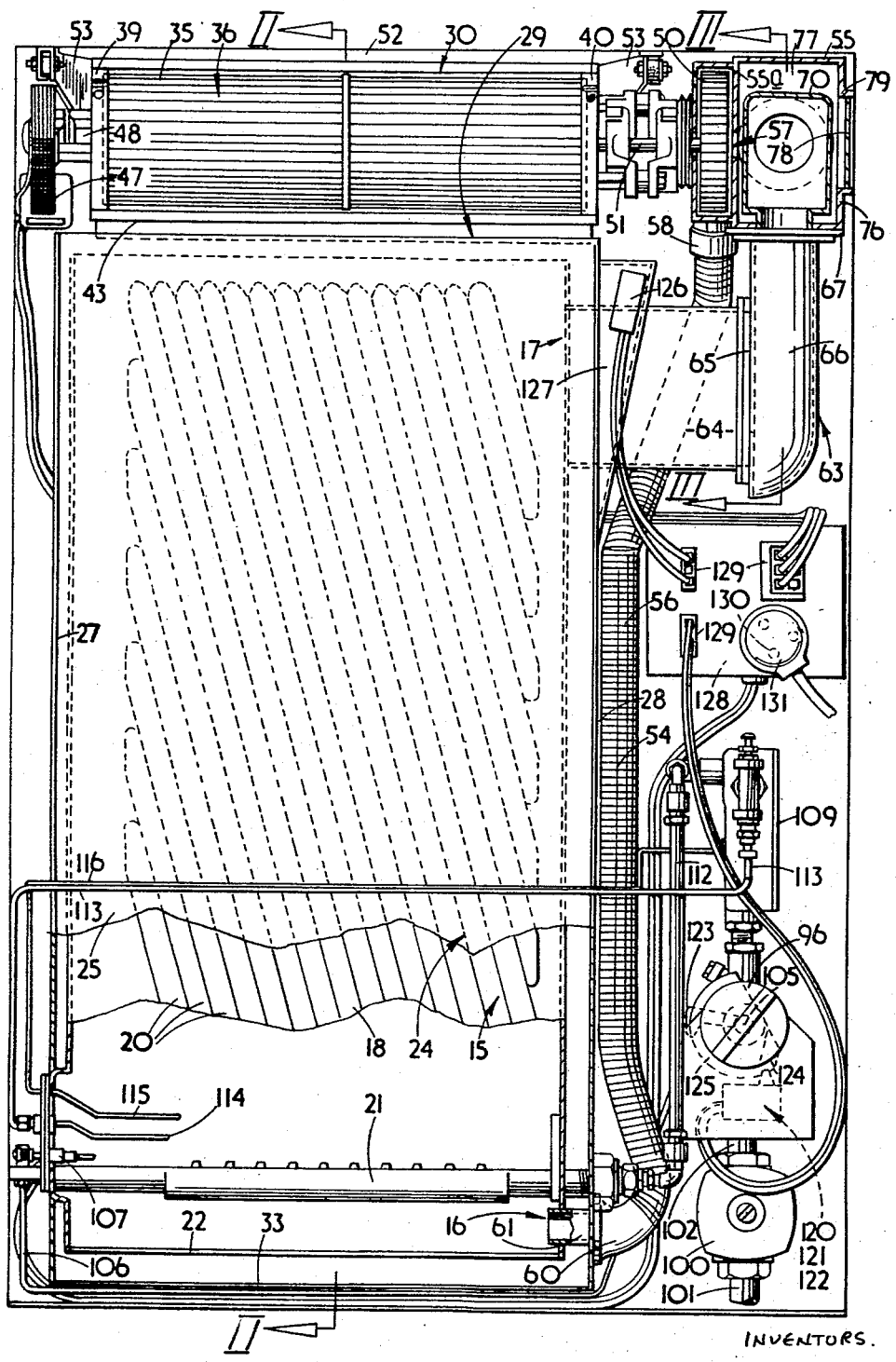
Figure 2:
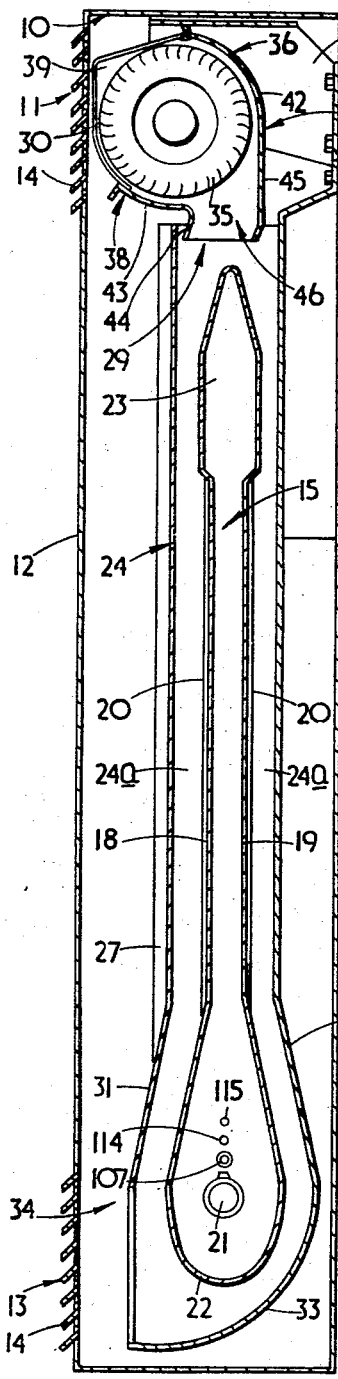
Figure 5:
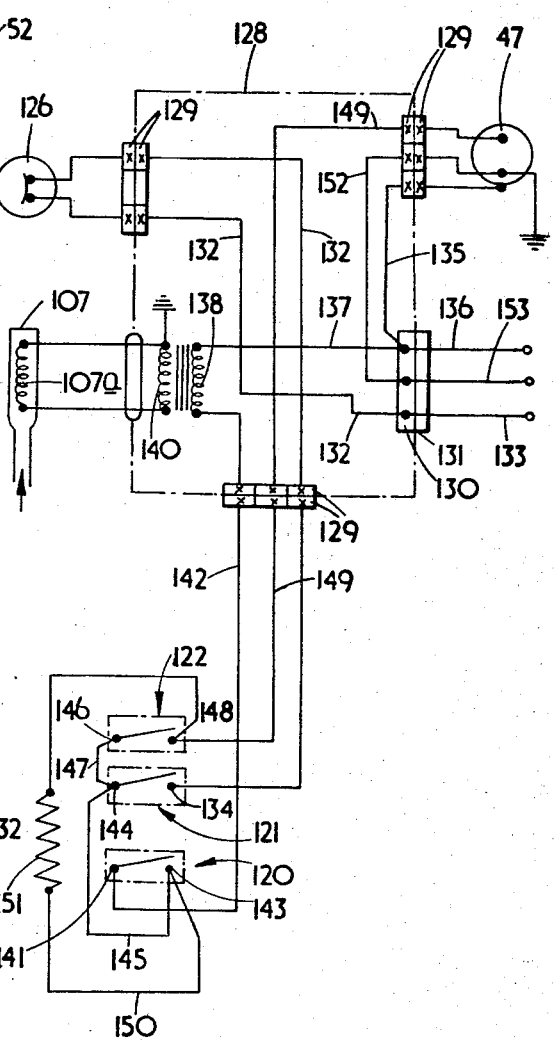
Figure 3:
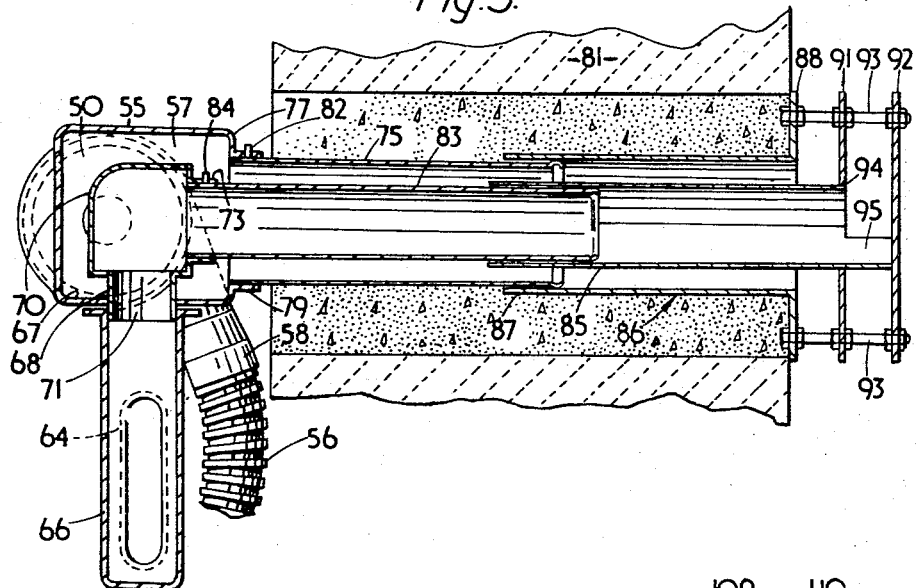
Figure 4:
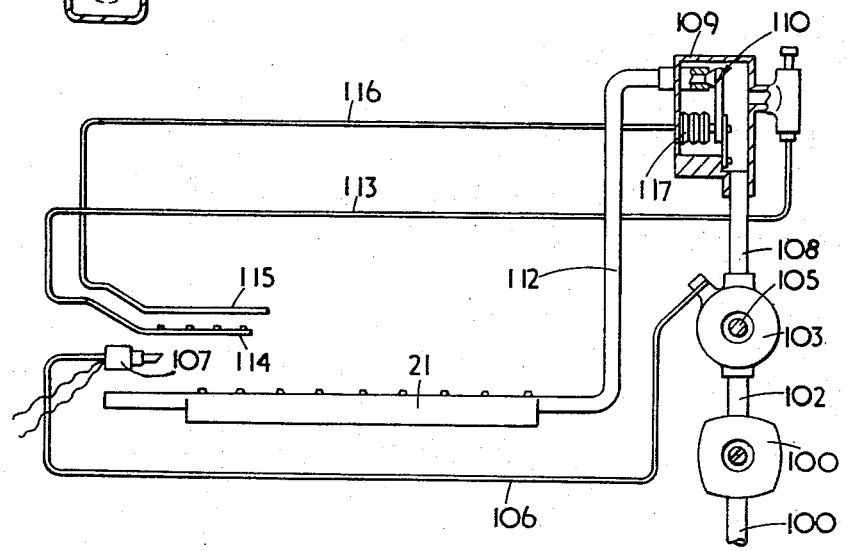

The invention will now be described in detail by way of example with reference to the accompanying drawings in which:

FIGURE 1 is a front elevation partly broken away, of a balanced flue heater embodying the invention and with its cover removed, FIGURE 2 is a cross-section on the line II—II in FIGURE 1 but with the cover in place, FIGURE 3 is a cross-sectional on the line III—III in FIGURE 1 and showing the connecton of the heater to a balanced flue terminal projecting through a wall of a space to be heated, FIGURE 4 is a diagram of the fuel system of the heater, and FIGURE 5 is an electric circuit diagram of the heater.

Referring to FIGURES 1 and 2 of the drawings, the heater includes a cover 10 having an inlet opening 11 formed in the upper end of its front wall 12, as shown in FIGURE 2, and a discharge opening 13 formed at the lower end of the front wall. Each opening 11 and 13 is fitted with a slotted grill 14. Within the cabinet 10 is mounted a hollow heat exchanger panel 15 (as hereinbefore defined) which is closed except for an air inlet 16 at the lower end thereof and a flue gas outlet 17 at the upper end thereof as shown in FIGURE 1. The front and rear walls 18 and 19 of the inner panel are corrugated, at 20, and a burner 21 for fluid fuel is mounted in the panel at the lower end which is enlarged to accommodate the burner and has a rounded lower edge 22. The upper end of the panel is also enlarged at 23 to provide an outlet 17 of the required size.

An outer hollow panel 24 is also mounted within the cover 10 and envelops the inner heat exchanger panel but is spaced therefrom to provide a passage 24a for air to be heated between opposed walls of the panels 15 and 24. The outer panel 24 comprises a front wall 25 and a rear wall 26 which are connected together at their vertical sides by side walls 27 and 28. The upper end of the panel 24 is left open to provide an inlet 29 adjacent to the outlet end of the inner panel 15. The lower portion of the front wall 25 flares outwardly at 31 in FIGURE 2 and the lower end of the wall terminates above the lower edges of the side walls 27 and 28. The rear wall 26 also flares outwardly at 32 and is extended by a portion 33 which curves under the round edge 22 of the inner panel 15 and terminates at a position vertically below the lower edge of the portion 31. Said lower edges of the front and rear walls 25 and 26, together with the side walls 27 and 28, define an outlet 34 at a location adjacent to the inlet end of the inner panel 15 and behind the cover outlet 13.

First and second co-axial fan means are provided to induce air to flow through the passages 24a and to deliver combustion air to the burner 21. The first fan means comprises a cross-flow fan 35 which extends along the upper end of the outer panel 24, adjacent to the inlet 29 and with its longitudinal axis horizontal. The fan 35 is mounted in a housing 36 which has a front opening 30 arranged behind the inlet 11, said housing comprising a rear wall 37 and a lower wall 38 which are connected together by end plates 39 and 40. The walls 37 and 38 each have a curved portion 42 and 43 respectively which extends partly around the periphery of the fan, as shown in FIGURE 2, and straight portions 44 and 45 which depend from the curved portions and, together with the end plates 39 and 40, form an outlet nozzle 46 which extends into the inlet 29 of the outer panel 24. A shaded pole electric motor 47 is secured to the end plate 39 and drives the fan 35 directly through a short spindle 48 which constitutes first driving means.

The second fan means comprises a centrifugal fan 50 which is co-axial with the fan 35 and is arranged at the end of the latter remote from the motor 47. The fan 50 is driven by the motor, through the fan 35, by a spindle 51 which connects the fans and which constitutes second driving means which is independent of the spindle 48 and which only drives the fan 50 when the fan 35 is rotating. The fan 35, the housing 36, the motor 47 and the fan 50 are mounted on a rear wall 52 by brackets 53.

An inlet duct, indicated generally at 54, receives air for combustion from the fan 50 and includes an outlet fitting in the form of a chamber 55, shown in FIGURES 1 and 3, and a flexible pipe 56 which is connected between the chamber 55 and the inlet 16 of the inner panel 15.

The fan 50 is located in a chamber 55a communicating with the chamber 55 through an aperture 57 and is arranged to discharge air through an outlet spigot 58. The flexible pipe 56 extends alongside the wall 28 of the outer panel 24 and has one end secured to the spigot 58 and its opposite end secured to a union 60 which is secured to the wall 28. The union 60 has a spigot 61 which extends into the inlet 16 of the inner panel 15.

An outlet duct for flue gases is indicated generally at 63 and includes a horizontal tube 64, generally oval in cross-section as shown in FIGURE 3, and which has one end secured to the outlet 17 and its other end secured to a wall 65 of a vertical tube 66 and communicates with the interior of the latter through an aperture in the wall 65. The tube 66 is secure to and depends from the lower wall 67 of the chamber 55 and communicates with the interior of the chamber through an aperture 68 formed in the lower wall 67. An outlet fitting 70 is located in the chamber 55 and is of inverted L-shape, as shown in FIGURE 3, having a spigot 71 at its lower end which fits telescopically within the tube 66. The arrangement is such that the fitting 70 may be rotated so that a spigot 73 at its upper end may be caused to face in a desired direction.

Each of two adjacent walls 76 and 77 of the chamber 55 is provided with a circular knockout panel such as that shown at 78 in wall 76, the panel being surrounded by a flange 79 which projects from the outer surface of the wall.

The end of an air inlet pipe 75 may be received in either of the flanges 79 so that the heater can be installed adjacent a room wall which may either be behind the heater or to the right hand side thereof as viewed in FIGURE 1. As shown in the drawings, the heater is arranged so that it is in front of a room wall 81. The knockout panel in the wall 77 has thus been removed and the end of the inlet air pipe 75 has been fitted within the flange 79 and secure therein by screw 82.

An outlet pipe 83 for flue gases is arranged concentrically in the pipe 75 and has one end entered into the spigot 73 and secured therein by a screw 84. The opposite end of the pipe 83 projects beyond the corresponding end of the pipe 75 and is arranged to be sleeved within an outlet pipe 85 of a balanced flue terminal fitting, indicated generally at 86, and which is fitted in an aperture in the wall 81 prior to installation of the heating device.

The terminal fitting 86 also includes an inlet pipe 87 within which the outlet pipe 85 is arranged concentrically, said pipe 87 having one end which projects from the inner surface of the wall 81 and within which the end of the pipe 75 is sleeved. The other end of the pipe 87 is provided with a radial flange 88 which abuts against the outer surface of the wall 81 and a pair of spaced discs 91 and 92 are supported by bolts 93 which project horizontally from the flange 88. The disc 91 has a central aperture 94 and the pipe 85 extends beyond the outer surface of the wall 81 and its outer end portion is located in the aperture 94. A lower peripheral portion 95 of the pipe 85 extends across the space between the discs 91 and 92.

Air for combustion is drawn by the fan 50 between the flange 88 and disc 91 and flows between the pipes 85 and 87 and the connected pipes 83 and 75 to the chamber 55 from where it is forced by the fan 50 through the inlet duct 54 to the burner 21. Flue gases from the panel 15 pass from the outlet 17 through the outlet tubes 64 and 66, to the outlet fitting 70 and then through the pipes 83 and 85 to escape between the discs 91 and 92. The lower peripheral extension 95 of the pipe 85 is provided to ensure that the hot flue gases will escape generally in an upward direction.

From the above description it will be seen that a part of the outlet duct which comprises the tubes 64 and 66, fitting 70, and pipes 83 and 85, is within a part of the inlet duct which comprises the pipe 56, chamber 55 and pipes 75 and 87. The enclosed portion of the outlet duct extends from the chamber 55 to the flue terminal 86. This arrangement has the advantage in that should flue gases escape from the enclosed portion of the outlet duct, said gases will not enter the space to be heated since they will be recirculated by being entrained in the combustion air delivered to the burner. A further advantage is that the outer surfaces of the enclosed portion of the inlet duct will remain cool, since air for combustion flows between the inner surfaces of the outlet duct and the outer surfaces of the inlet duct. A still further advantage is that the combustion air will be dried and pre-heated as it flows over the hot outer surfaces of the outlet duct during its passage to the burner.

Controls for the heater are arranged to the right of the outer panel 24 and below the tubes 64 and 66, as shown in FIGURE 1, and include a single control knob 96 which is arranged to initiate a flow of fuel (in the example described, gas) to the burner, cause the fuel to be ignited and control the rate of flow of the fuel after ignition.

The fuel system of the heater is shown in FIGURE 4 and comprises a non-return valve 100 to which the main fuel supply line 101 is connected. The valve 100 is connected by a pipe 102 to a control valve 103 which is operated by rotation of a spindle 105 to which the knob 96 is secured. A branch pipe 106 extends from the valve 103 to an electric igniter 107 arranged at the end of the burner 21 remote from the air inlet 16. The valve 103 is connected by a pipe 108 to a chamber 109 containing a valve 110 which is biased to its closed position as shown in FIGURE 4 in which it prevents entry of fuel to a pipe 112 connecting the chamber 109 to the burner 21. A branch pipe 113 extends from the chamber 109 to a pilot burner 114 which is arranged adjacent to the igniter 107. A mercury tube 115 is arranged above the burner 114 and is connected by a capillary tube 116 to a bellows 117 in the chamber 109.

Operation of the system is as follows. When the valve 103 is opened by rotation of the spindle 105, fuel flows through the valve to the igniter 107, to the chamber 109 and to the pilot burner 114. To start with the valve 110 is closed. Rotation of the spindle 105 to open the valve 103 simultaneously closes electrical contacts, as will later be described, to cause the igniter 107 to ignite the fuel supplied thereto. The pilot burner 114 is thus ignited and this causes the mercury in the tube 115 to expand thus displacing a column of liquid along the capillary tube 116 to expand the bellows 117 to open the valve 110 so that fuel may flow from the chamber 109 to the burner 21 where it is then ignited by the pilot burner 114.

It will be seen that should the fuel supply to the heater be cut-off while it is operating, so that the burners 21 and 114 are extinguished, the valve 110 will automatically close. When the fuel supply is restored, fuel will not flow to the burner 21 until the control knob 96 is again operated.

The electrical controls of the heater, shown in FIGURES 1 and 5, include a switch 120 for the igniter 107 and switches 121 and 122 for the motor 47. The spindle 105 carries a finger 123 and two cams 124 and 125 which are arranged to close the switches 120, 121 and 122 respectively as the spindle is turned to open the valve 103. The electrical controls also include an overheat relay 126 which is arranged adjacent to the outlet 17 in a chamber 127 projecting from the side wall 28 of the outer panel 24.

A junction panel 128 is arranged immediately below the tubes 64 and 66 and leads of the electric circuit are connected to the panel by snap-in connectors 129. A three pin socket 130 on the panel receives a plug 131 connected to a mains supply.

Referring to the circuit diagram shown in FIGURE 5, a line 132 connected to a mains line 133 contains the relay 126 and is connected to one contact 134 of the switch 121. A line 135 is connected to the other mains line 136 and is connected to a terminal of the motor 47. A line 137 is connected between the line 136 and to one end of the primary coil 138 of a step-down transformer 139. The secondary coil 140 of the transformer is connected to an ignition coil 107a of the igniter 107. The other end of the primary coil 138 is connected to one contact 141 of the ignition switch 120 by a line 142. The other contact 143 of switch 120 is connected to contact 144 of the switch 121 by a line 145 and the contact 144 is in turn connected to contact 146 of the switch 122 by a line 147. The other contact 148 of the switch 122 is connected to another terminal of the motor 74 by a lead 149 and the contact 148 is also connected to the contact 143 of switch 120 by a line 150 which contains a load resistor 151. The neutral terminal of the motor 47 is earthed and connected by a line 152 to the neutral mains line 153.

As the control knob 96 is turned anti-clockwise, as seen in FIGURE 1, to open the valve 103 the cams 124 and 125 close the switches 121 and 122. A current then flows from the mains line 133 along the line 132, the overheat relay 126 and through the switches 121 and 122 to the motor 47, the circuit being completed to the line 136 by the line 135. Upon rotation of the knob 96 the finger 123 momentarily closes the switch 120 thus sending a pulse through the primary 138 of the transformer 139 and to the ignition coil 107a thus igniting the pilot burner 114 and, after the valve 110 has opened, igniting the burner 21. The motor 47 is connected directly across the mains line so that the fans 35 and 50 are rotated at maximum speed.

The spindle 105 is spring loaded to turn clockwise after being initially turned by hand in an anti-clockwise direction, said spindle returning to a pre-set position where the finger 123 is clear of the switch 120 but where the cams 124 and 125 maintain the switches 121 and 122 closed.

If it is desired to reduce the heat output of the heater, the control knob 96 is turned clockwise so that the valve 103 is partly closed while simultaneously the cam 125 is turned by the spindle to allow the switch 122 to open so that the load resistor 151 is brought into the motor circuit which then comprises line 132, switch 121, lines 145 and 150, and resistor 151 and line 149. The voltage across the motor is thus reduced so that the fans are rotated at a lower speed. The heater is turned off by further clockwise rotation of the spindle 105 so that the valve 103 is closed thereby extinguishing the burner 21 and pilot burner 114. During this further rotation of the spindle, the cam 124 is turned to open the switch 121 so that the motor 47 is switched off.

Operation of the heater is as follows: Combustion air is drawn by the fan 50 into the pipe 87 of the flue terminal 86 and through the pipe 75 to the chamber 55. The air is then forced by the fan 50 through the flexible pipe 56 and through the inlet 16 of the inner panel 15 to support combustion of fuel supplied to the burners 21 and 114. The flue gases then pass upwardly within the inner panel and pass through the outlet 17, into the tubes 64 and 66, into the outlet fitting 70 and are then discharged through pipe 83 and the pipe 85 to the flue terminal 86.

Air to be heated is drawn in by the fan 35 through the inlet 11 of the cabinet 10, discharged into the inlet 29 and then flows down the passages 24a between the panels 15 and 24. Finally the heated air is discharged through the outlet 34 of the panel 24 and through the outlet 13 of the cover 10. It will be seen that during its downward flow between the walls of the panels, substantially the whole of the heat exchange between the flue gases and the air to be heated is effected while the air and flue gases are flowing in parallel directions in countercurrent.

During operation of the heater, should the fan 35 develop a fault and fail to pump sufficient air through the heater to keep the panel 15 below a predetermined temperature, the undesired high temperature of the flue gases will be sensed by the relay 126 and the latter will operate to cut off the electrical supply to the motor 47. As a result the fan 50 will cease to pump combustion air to the burner 21 in the interior of the panel 15. The inlet pipe 56 has a cross-sectional area such that the natural flow of air therethrough is insufficient to support combustion of the burner 21 which will accordingly be extinguished. As the pilot burner 114 is arranged at a position remote from the air inlet 16, insufficient air will reach said burner to support combustion and the latter will also be extinguished thus causing the valve 110 to close and cutting off the supply of gas to the burner 21. The heater will also fail safe if the motor 47 breaks down or the electrical supply fails since the fan 50 will cease to deliver combustion air and the burners will be extinguished and the gas supply cut off as described above. If the driving connection between the fans 35 and 50 or between the motor 47 and the fan 35 should fail, then the burners will be extinguished as described above. It will be seen that in no circumstances will the fan 50 continue to be driven if the fan 35 is not driven so that there is no risk of overheating from this source.

It will be seen that the device is extremely simple and also efficient since the air being heated is in countercurrent to the flue gases flowing from the burner 21.

Owing to the dimensions of the inner and outer panels 15 and 24 the heater is shallow from front to rear and is extremely easy to install since the outlet fitting 70 may be arranged in either of two positions in the chamber 55 so that the heater may be arranged either in front of a wall of a space to be heated or arranged with a wall to one side thereof. Installation is also simplified in that the flue terminal fitting 86 has concentrically arranged inlet and outlet pipes 85 and 87 so that it is only necessary to form a single aperture in a wall which is to receive the fitting. Furthermore, since a part of the length of the outlet duct for flue gases is telescoped within a part of the length of the combustion air inlet duct, the danger of flue gases escaping into the space to be heated is considerably reduced.

The invention has been specifically described as using a cross-flow fan 35 to induce a flow of air to be heated. If desired, however, other types of fan may be used. Thus, a centrifugal fan may be used or a number of propeller fans or centrifugal fan may be mounted on a shaft, the latter being arranged to be driven by the motor and located across the inlet to the outer panel.

What is claimed is:

1. A heater having a sealed combustion system and comprising an inner hollow heat exchange panel comprising two opposed side walls of sheet material extending between opposite ends of the panel and having lengths between said ends, and widths measured at right angles to said lengths, considerably greater than the thickness of the panel, the panel having an air inlet adjacent to one end thereof and a flue gas outlet adjacent to the other end thereof, the panel otherwise being closed; a burner for fluid fuel mounted in the panel adjacent to said one end; an outer hollow panel enveloping the inner panel but spaced therefrom to provide a passage for air to be heated between opposed walls of the panels, the outer panel having an air inlet adjacent to its end which is adjacent to the other end of the inner panel and having an outlet for heated air adjacent to its end which is adjacent to the one end of the inner panel so that substantially the whole of the heat exchange between the flue gases and the air to be heated which takes place through the walls of the inner panel is effected while the air and the flue gases are flowing in generally parallel directions in countercurrent; first and second co-axial fan means; an electric motor; first driving means interposed between the first fan means and the motor; second driving means independent of the first driving means and interposed between the second fan means and the first fan means, said second driving means driving the second fan means only when the first fan means is rotating, the first fan means being located adjacent to the inlet of the outer panel to induce air to flow through said passage; and an air inlet duct to receive air for combustion from the second fan means and to deliver it to the inlet of the inner panel, the cross-sectional area of at least a part of the inlet duct being of such a size that the natural flow of air therethrough is insufficient to support combustion of the burner when the second fan means is inoperative.

References Cited

UNITED STATES PATENTS

| | | |
|---|---|---|
| 2,185,490 | 1/1940 | Wittman. |
| 2,286,853 | 6/1942 | Holthowe. |
| 2,314,089 | 3/1943 | Hess et al. _____ 126—110 |
| 2,581,942 | 1/1952 | Collins et al. |
| 2,998,003 | 8/1961 | Grooms _____ 126—110 X |
| 3,064,638 | 11/1962 | Bauer _____ 126—110 |
| 3,236,454 | 2/1966 | Reichelderfer _____ 126—85 X |
| 3,263,749 | 8/1966 | Dormitzer _____ 126—110 X |

FOREIGN PATENTS 850,852   10/1960   Great Britain.

JAMES W. WESTHAVER, *Primary Examiner.*